United States Patent
Kim et al.

(10) Patent No.: US 9,879,185 B2
(45) Date of Patent: Jan. 30, 2018

(54) DEVICE AND METHOD FOR INCREASING THE INTERNAL SURFACE OF A COMPACT COKE CHARGE IN A RECEIVING TROUGH

(75) Inventors: Ronald Kim, Essen (DE); Franz-Josef Schücker, Muelheim an der Ruhr (DE)

(73) Assignee: THYSSENKRUPP UHDE GMBH, Dortmund (DE)

(*) Notice: Subject to any disclaimer, the term of this patent is extended or adjusted under 35 U.S.C. 154(b) by 689 days.

(21) Appl. No.: 13/980,938

(22) PCT Filed: Dec. 20, 2011

(86) PCT No.: PCT/EP2011/006421
§ 371 (c)(1),
(2), (4) Date: Aug. 23, 2013

(87) PCT Pub. No.: WO2012/097845
PCT Pub. Date: Jul. 26, 2012

(65) Prior Publication Data
US 2014/0048406 A1    Feb. 20, 2014

(30) Foreign Application Priority Data
Jan. 21, 2011   (DE) .................. 10 2011 009 176

(51) Int. Cl.
*C10B 39/14*       (2006.01)
*C10B 33/14*       (2006.01)

(52) U.S. Cl.
CPC .............. *C10B 39/14* (2013.01); *C10B 33/14* (2013.01); *Y02P 20/129* (2015.11)

(58) Field of Classification Search
CPC ...................................................... C10B 39/14
See application file for complete search history.

(56) References Cited

U.S. PATENT DOCUMENTS 4,142,942 A * 3/1979 Calderon ................ C10B 39/04
202/227
4,382,842 A * 5/1983 Kwasnik ............... C10B 33/003
202/263

(Continued)

FOREIGN PATENT DOCUMENTS

DE      287043      6/1914
DE      582264      8/1933

(Continued)

OTHER PUBLICATIONS

Machine translation DE 10 2006 047 226 (Feb. 2008).*

(Continued)

*Primary Examiner* — Jyoti Nagpaul
(74) *Attorney, Agent, or Firm* — Brooks Kushman P.C.

(57) ABSTRACT

A device for increasing the interior surface of a compact coke charge in a receiving trough, which device increases the interior surface of a coke cake or coke leaving the coking chamber by mechanically breaking apart or roughening it, resulting in a break-up of the coke structure and the formation of crevice-type cavities in the compacted coke charge so that an increased amount of water can flow into the interior of the coke charge during the subsequent quenching step through these crevices, resulting in a high profitability of the method due to reduced quenching times and lower water consumption. A method for increasing the interior surface of a compact coke charge in a receiving trough, which serves to break up a fresh coke cake or to roughen the coke in order to reduce water consumption during quenching is disclosed.

17 Claims, 7 Drawing Sheets

(56) References Cited

U.S. PATENT DOCUMENTS

| | | |
|---|---|---|
| 4,842,695 A | 6/1989 | Schmid et al. |
| 5,564,340 A | 10/1996 | Baird et al. |
| 8,152,970 B2 | 4/2012 | Barkdoll et al. |
| 2011/0314727 A1 | 12/2011 | Kim |

FOREIGN PATENT DOCUMENTS

| | | |
|---|---|---|
| DE | 1253669 | 11/1967 |
| DE | 102006047226 | 2/2008 |
| DE | 102009012453 | 9/2010 |
| EP | 0084786 | 8/1983 |
| EP | 0964049 | 12/1999 |
| WO | 9109094 | 6/1991 |
| WO | 2006089612 | 8/2006 |
| WO | 2007103649 | 9/2007 |

OTHER PUBLICATIONS

International Search Report for PCT/EP2011/006421, English translation attached to original, Both completed by the European Patent Office on May 14, 2012, All together 5 Pages.

\* cited by examiner

DEVICE AND METHOD FOR INCREASING THE INTERNAL SURFACE OF A COMPACT COKE CHARGE IN A RECEIVING TROUGH

CROSS-REFERENCE TO RELATED APPLICATION

This application is the U.S. national phase of PCT Application No. PCT/EP2011/006421 filed on Dec. 20, 2011, which claims priority to German Patent Application No. 10 2011 009 176.9 filed on Jan. 21, 2011, the disclosures of which are incorporated in their entirety by reference herein.

BACKGROUND OF THE INVENTION

1. Field of the Invention

The invention relates to a contrivance for increasing the inner surface of a compact coke batch in a receiving container which increases the inner surface of a coke cake and coke leaving the coke-oven chamber by means of mechanical breaking up or roughening, by which the coke structure loosens up and gap-like cavities form in the compacted coke batch so that into these gap-like cavities an increased amount of water can flow towards the inside of the coke batch during the subsequent cooling process with water, resulting in a higher economic efficiency of the method by the reduced quenching time and the lower water consumption for coke quenching. The invention also relates to a method for increasing the inner surface of a compact coke batch in a receiving container which serves for breaking up a fresh and hot coke cake or roughening the coke in order to reduce the water consumption during quenching.

2. Description of the Related Art

The coal-to-coke carbonisation of is frequently carried out in so-called heat-recovery or non-recovery-type coke-oven chambers. Modern coke-oven chambers are provided with so-called coke transfer machines on the coke side of the coke-oven batteries, such machines being used for operations to be implemented for coke-sided pushing of the carbonised coke. Normally the coke quenching device is a quenching car which can be—at least partly—moved separately underneath the coke transfer machine. The quenching car typically includes a receiving container which takes up the coke from the coke-oven chamber and takes it to the quenching tower. Between the receiving container and the coke-oven chamber there is a coke transfer machine which, in a simple case, may consist of a wharf or a sloped plate. The quenching car typically travels on rails and can be moved directly below the quenching tower by means of a transport device. The quenching tower is a wet-quenching tower according to an embodiment frequently used but it can also be a dry-quenching tower.

The coke is normally pushed into this quenching car at average temperatures of 900 to 1100° C. The conventional receiving container of a quenching car is frequently lined with heat-resistant structural members. In the case of the "heat-recovery" or "-on-recovery" carbonisation process these structural members normally consist of evenly arranged planar plate elements on which the coke can slide from the coke-oven chamber across the wharf to the inside of the receiving container. Once the quenching car has been completely filled with the hot coke batch, the receiving container and the quenching car are moved to the quenching tower. There, in a common embodiment, the coke is quenched with water. For this purpose, the water is sprayed vertically downwards onto the hot coke cake from an available storage tank. The water leaves the water storage tank via nozzles and is uniformly distributed over the upper surface of the coke, resulting in a homogeneous water content in the coke.

A typical contrivance including a quenching car for wet quenching is described in DE 1253669 B. The invention relates to a contrivance for quenching coke that has been discharged from horizontal coking chambers, the contrivance consisting of a stationary quenching compartment with a stack-like part and travelling along the oven battery on the coke side or being supplied from a receiving car for glowing coke, and a coke receiving compartment which is followed by a circulating conveying grid with spraying system on top, in which tube bundles containing heatable process fluid are installed above the conveying grid between the device for controlling the height of the coke layer and the spraying system, these tube bundles possibly communicating with the known tube bundles of the coke receiving compartment. Embodiments of a quenching car and its control system are disclosed by WO 2006/089612 A1, U.S. Pat. No. 5,564,340 A and EP 964049 A2.

There are also embodiments where the coke is quenched from below by supplied water. Such embodiment is also called "bottom quenching". It is also common practice to combine both quenching methods. Typical embodiments of a dry quenching method are disclosed by WO 91/09094 A1 and EP 0084786 B1.

Coke quenching systems are normally designed assuming that bulk coal batches are mostly of low coal densities between 700 and 850 $kg*m^{-3}$. The length of the coal batch is typically up to 20 m. Conventional state-of-the-art coking processes yield coke batches of densities between 400 and 600 $kg*m^{-3}$ at the end of the coking process. For increasing productivity compaction rates of the feed coal mixture of initial densities between 850 $kg*m^{-3}$ and 1200 $kg*m^{-3}$ have been introduced in the recent past in plant engineering. DE 102009012453 A1 teaches an exemplary process for the compression of the feed coal to the densities mentioned including subsequent shaping of the compressed coal cake. On account of the higher initial density of the coal, the density of the coke cake after the coking process will also be higher, and will cause sealing of the coke cake surface. The result is that the quenching water cannot penetrate vertically into the coke batch or only with delay.

An additional impedance to the effective cooling of the fresh coke batch is the so-called "Leidenfrost effect". As the temperature of the coke batch is high, the water impinging on the surface of the hot coke will evaporate instantaneously. As a result a coat of water vapour forms around the coke pieces preventing the entry of further water. The water impinging on the surface of the coke forms a protective vaporous coat for a limited period of time and protects the coke from direct heat transfer. In this way the water cannot penetrate efficiently into the inside of the coke and therefore flows off laterally not reaching the inner coke layers.

In this way the quenching water is distributed non-uniformly across the entire volume of the coke batch. As this will also cause non-uniform cooling by the quenching water, the temperature distribution across the coke batch will likewise be non-uniform. Hence, there will still be parts of the coke cake after quenching that show a coke temperature of more than 100° C. This is a significant problem when processing and using the coke downstream, as coke batch portions of temperatures above 100° C. can damage transport and conveying belts which are frequently made of hard rubber or plastics. The quenched coke will thus also consist of batch parts the water content of which is above 3 weight percent (wt.-%). An elevated coke water content of more than 3 wt.-% is also a problem, as the water will diminish the product quality of the raw iron in the downstream blast-furnace process.

SUMMARY OF THE INVENTION

It is therefore the aim to provide a method which allows quenching and cooling of the glowing coke while preventing non-uniform temperature distribution or water content of the coke batch.

The invention achieves this aim by a contrivance arranged in a receiving container which in a preferred embodiment is placed in a quenching car for fresh and hot coke and at least one structural member producing unevenness of a min. height of 20 mm is arranged on the bottom of the receiving container. The coke cake pushed from the coke-oven chamber slips out of the coke-oven chamber during the pushing operation and slides across the structural member such that on account of its unevenness the structural member breaks up the coke batch by the weight and the kinetic energy of the coke batch.

DETAILED DESCRIPTION OF THE PREFERRED EMBODIMENTS

The structural member is of random type but is preferably of a shape which promotes the breaking up of the hot coke batch. The structural member is preferably temperature-resistant such that it cannot be deformed by the hot coke batch. However, the structural member can also be combustible provided the mechanical stability of the structural member is rated such that it is sufficient for single break-up of the coke batch. In this case, the structural member burns when the coke slides across said structural member and is replaced after each pushing operation.

Claim is particularly laid to a contrivance for increasing the inner surface of a compact coke batch in a receiving container, consisting of a horizontal coke-oven chamber as part of a heat-recovery or non-recovery-type coke-oven bank with coke-oven chamber doors at the front end, a receiving container provided on or in a coke quenching car for fresh and hot coke, the quenching car allowing to be moved in parallel to and along the coke-oven chamber front, and which is characterised in that at least one structural member producing unevenness of a min. height of 20 mm is arranged on the bottom of the receiving container.

The structural member is designed and shaped in such a way that the structural member allows breaking up of the coke batch by the weight and the kinetic energy of the coke batch. In a typical embodiment, the structural member is wedge-shaped. In a further embodiment the structural member is cuboid or ring-shaped. In the case of a wedge-shaped or cuboid embodiment the structural member is preferably aligned in such a way that the wedge or cuboid is arranged in parallel to the pushing direction of the coke. The structural member can also be of the half-ring-type, the ring-forming half on the bottom of the receiving container being aligned in any direction. In a further embodiment the structural member is hump-shaped or conical. It is also possible to combine differently shaped structural members.

In a typical embodiment the structural members are arranged in rows. In such case, the rows preferably consist of equally shaped structural members. However, such rows can also consist of structural members that are differently shaped or arranged. The arrangement in rows can also be carried out such that coke-impermeable air gaps are located between the rows of the structural members, these air gaps being arranged in the bottom of the receiving container and aerating the bottom of the receiving container downwards.

The structural member can be made of any material. In an embodiment of the invention this structural member is made of a heat-resistant metal. In a preferred embodiment this structural member is made of heat-resistant steel. In a further embodiment this structural member is made of a ceramic material. However, the structural member can also be made of a silicon-containing or aluminium-containing oxidic material. These materials are normally used for constructing coke-oven chambers and are temperature-resistant such that they remain stable during a multitude of pushing operations. In a further embodiment the structural members can be made of a combustible material. The combustible material is, for example, wood or compressed coke breeze. This material is sufficiently stable to allow single break-up of the coke batch. It will be replaced after each pushing operation if additional break-up of the coke batch is desired during pushing.

The receiving container is typically an integral part of a quenching car. The quenching car is loaded by the pusher machine. In a preferred embodiment there is a vertical offset between the bottom of the coking chamber and the receiving container. In a further embodiment there is a sloped plate or wharf between the bottom of the coking chamber and the receiving container for transferring the coke to the receiving container. The former can be designed as commonly used in the state of the art. DE 582264 C discloses an embodiment of a wharf which is suitable for transferring the coke to the receiving container. In an embodiment of the present invention the wharf can also be provided with at least one heat-resistant inventive structural member producing unevenness of a height of min. 20 mm. For this purpose, the wharf can be equipped with lateral walls.

In an embodiment of the invention the surface of the receiving container is 20 to 400 mm below the level of the coke-bearing bottom of the coke-oven chamber. Hence, a difference in height (Δh) or an offset forms between the bottom of the coke-oven chamber and the receiving container. On account of this, the coke batch develops enough kinetic energy when being pushed so that it breaks up when dropping or sliding into the receiving container.

Claim is also laid to a method for increasing the inner surface of a coke batch when being pushed into a receiving container and a quenching car. The inner surface is increased as the hot coke batch breaks up when being transferred to the receiving container, shaping of the structural members also being a means to increase the surface of the coke pieces.

Claim is particularly laid to a method for increasing the inner surface of a compact coke batch, in which the coke-oven chamber of a heat-recovery or non-recovery type coke-oven bank is charged with coal for carbonisation, this coal being carbonised in operating cycles, and after the carbonisation process, the coke is pushed by a pusher machine in form of a compact and solid coke cake from the coke-oven chamber into the receiving container of a quenching car, and which is characterised in that during the pushing operation the compact and solid coke cake is pushed into the receiving container across the structural members producing unevenness on the bottom of the receiving container such that the fresh and glowing coke breaks up towards the top and is divided into several parts.

Frequently the coke cake is pushed across an offset or a wharf such that a difference in height must be overcome. Overcoming the difference in height allows the coke cake to gain kinetic drop energy which helps to break up the coke cake. In a typical embodiment the compact and solid, hot coke cake is pushed into the receiving container housing the structural member(s) during pushing in order to increase the inner surface of the coke cake and thus also the permeability of the coke for the quenching water. It is conceivable to use the structural members for generally any coke type, provided it is fresh and hot and suitable for increasing the inner surface. In this way, the structural members can also be used to push fresh but already quenched coke across a plate or a container equipped with the inventive structural members and to increase the inner surface of the coke by doing so.

The coke is typically pushed from the coke-oven chamber into the receiving container across a wharf or a sloped plate which overcomes a difference in height between 20 and 400 mm. In a further embodiment the hot coke on being pushed from the coke-oven chamber to the level of the receiving container is pushed across an offset which overcomes a difference in height between 20 and 400 mm as compared to the bottom of the coke-oven chamber. An offset causing a larger difference in height would result in an increased formation of emissions and a corresponding impact on the environment as known from the conventional horizontal coke-oven chamber carbonisation technology, this being the reason for the use of exhaust hoods for the evacuation of emissions.

In an embodiment of the method the structural members can be made of a high-temperature-resistant material, which will allow using the structural members for a multitude of pushing operations. However, the structural member(s) can also be made of combustible material. The structural member will then be replaced after each pushing operation if multiple operations are desired.

The structural member(s) can also be made up of individual components, the structural member being made up of individual components prior to each insertion into the receiving container. In this way, the structural members can be prepared more efficiently for the respective application.

The inventive method can be used for any kind of coke-oven chambers and coke-oven banks of the type mentioned at the beginning. The method can be used for both a coke wet-quenching method with or without "bottom quenching" and for a coke dry-quenching method.

The invention has the advantage to allow the quenching and cooling of the glowing coke while preventing non-uniform distribution of the temperature or the water content of the coke batch. On account of this, a coke is obtained which due to a reduced residual water content renders an improved quality of the raw iron. The inventive method also results in an exclusion of residual embers in the finished coke such that the downstream facilities for transport and use for the coke are spared. Thus, an improved economic efficiency of the entire coking process is achieved in all.

Figure 1:
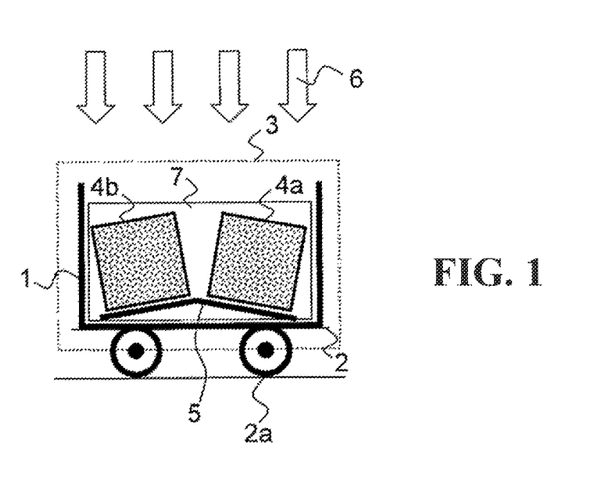
FIG. 1 illustrates one embodiment of a receiving container of the invention.
Figure 2:
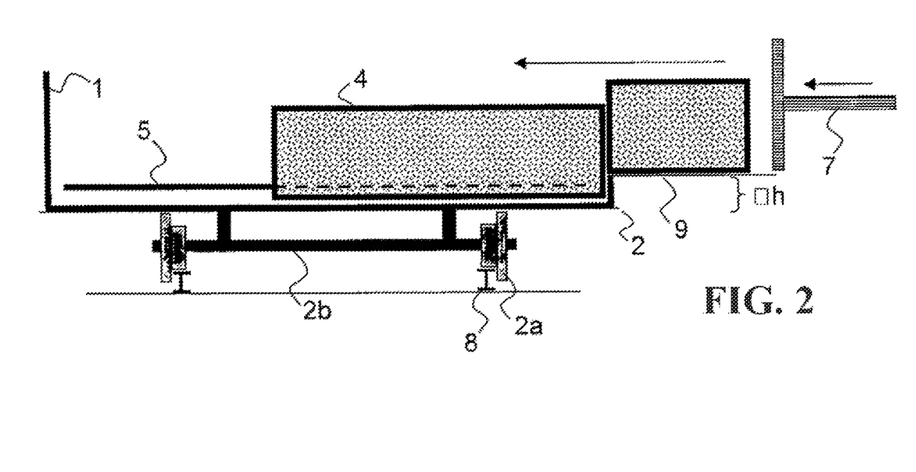
FIG. 2 illustrates one embodiment of a receiving container of the invention and its relation to the coke wharf and pusher ram.
Figure 3:
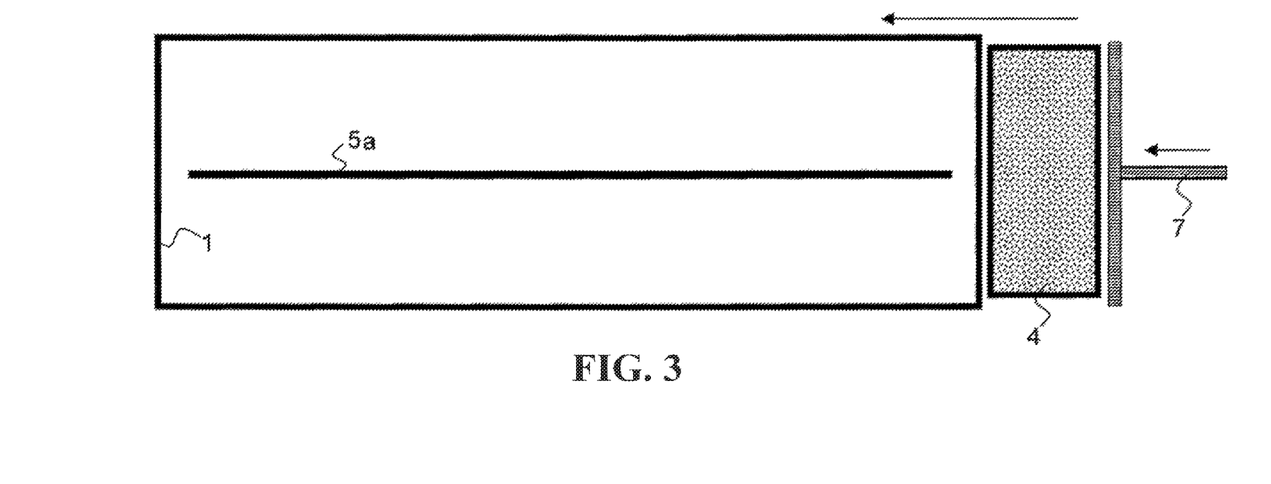
FIG. 3 illustrates a further embodiment of a receiving container of the invention and its relation to the coke wharf and pusher ram.
Figure 4:
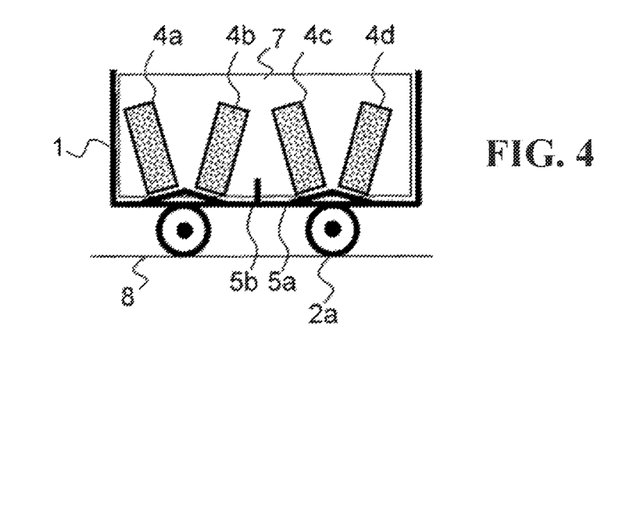
FIG. 4 illustrates further embodiment of a receiving container of the invention.
Figure 5:
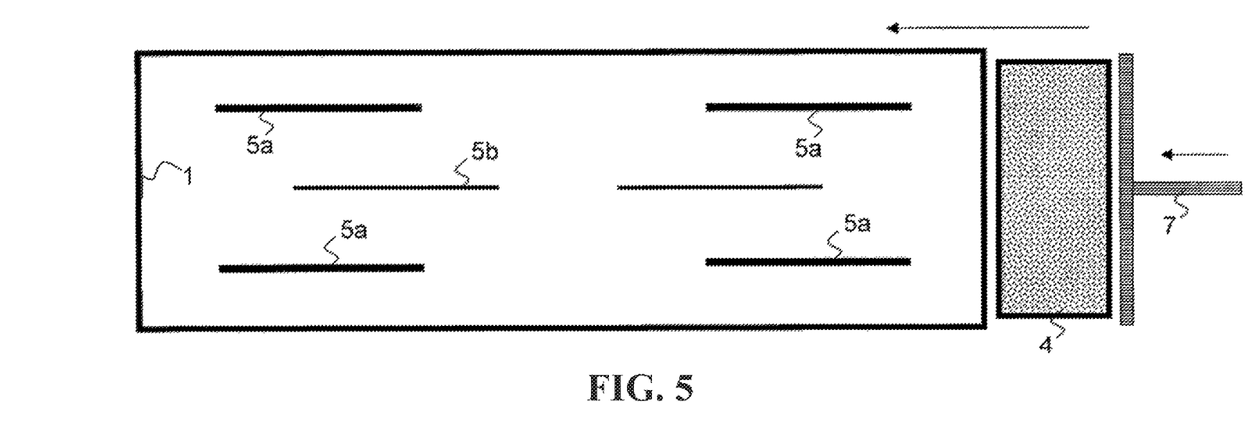
FIG. 5 illustrates another embodiment of a receiving container of the invention.
Figure 6:
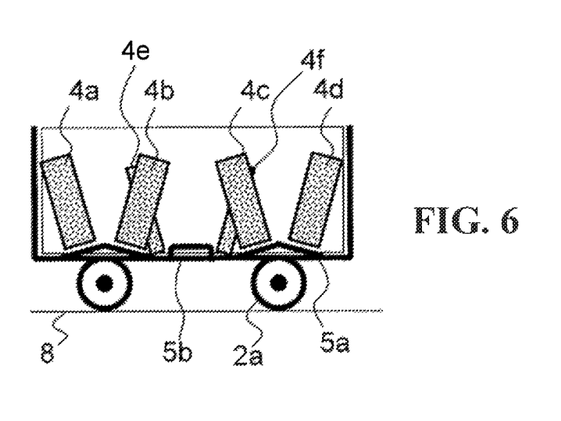
FIG. 6 illustrates another embodiment of a receiving container of the invention.
Figure 7:
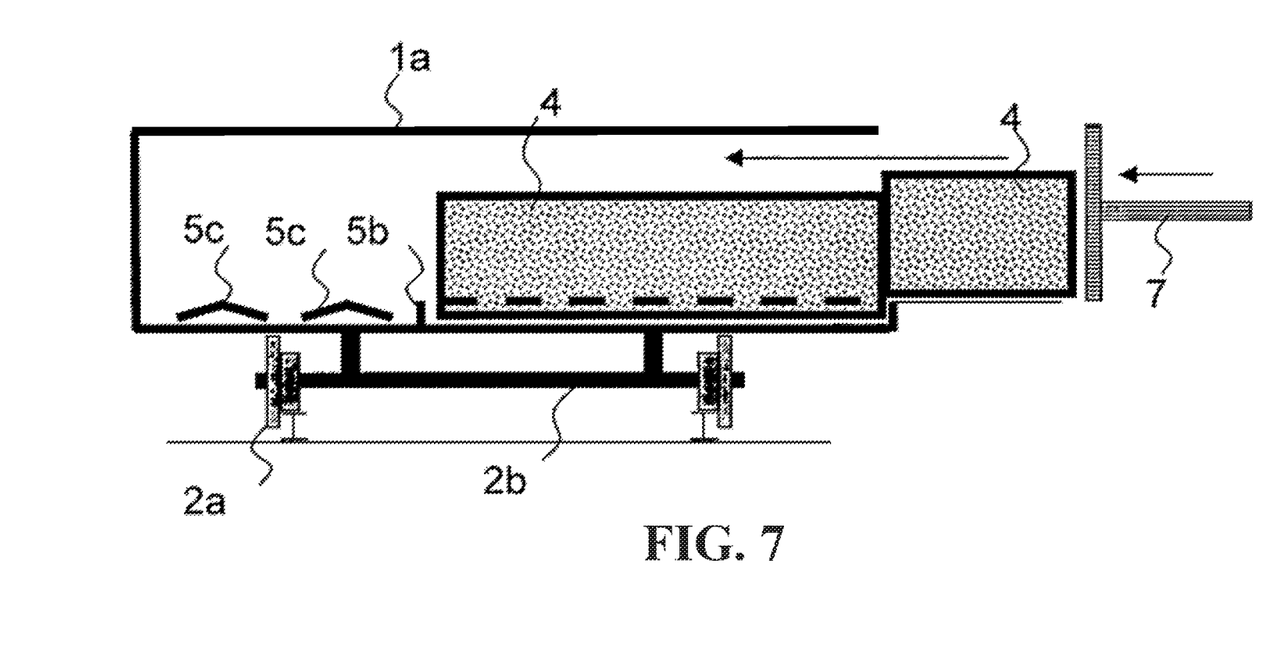
FIG. 7 illustrates another embodiment of a receiving container of the invention.
Figure 8:
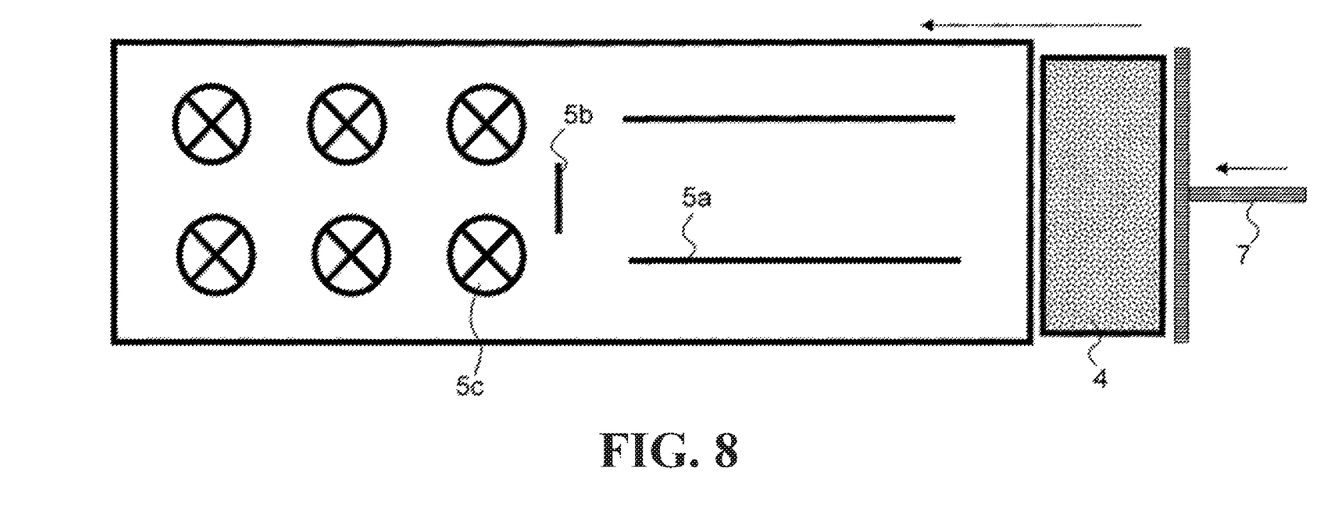
FIG. 8 illustrates another embodiment of a receiving container of the invention.

The invention is illustrated in more detail by means of eight drawings, the inventive method not being limited to these embodiments. FIG. 1 to FIG. 3 show embodiments of a receiving container in a quenching car equipped with a wedge-shaped structural member. FIG. 4 to FIG. 5 show embodiments of a receiving container in a quenching car equipped with a multitude of wedge-shaped structural members. FIG. 6 to FIG. 8 show embodiments of a receiving container in a quenching car equipped with a multitude of wedge-shaped structural members of different shape.

FIG. 1 shows a receiving container (1) in a quenching car (2) with wheels (2a) arranged in front of a coke-oven chamber door (3). The coke batch (4a,4b) is pushed into the receiving container (1), the coke batch (4) being broken up into two partial batches (4a,4b) by means of the wedge-shaped structural member (5a) arranged on the bottom of the receiving container (1). This results in an increase of the inner surface of the coke batch (4) as a result of which the quenching water (6), which flows down onto the top of the coke batch (4a,4b) during the quenching operation, can also enter the inside of the coke batch (4a,4b). The figure also shows the pusher ram (7) of the pusher machine.

FIG. 2 shows a lateral view of the same receiving container (1), with the pusher ram (7) of the pusher machine being included. The figure also shows the axles (2b) and the wheels (2a) of the quenching car (2) arranged on a rail (8). The hot coke (4) is pushed in direction of the arrow from the coke-oven chamber via a wharf (9) into the receiving container (1), the coke (4) overcoming a difference in height Δh (10) between 20 and 400 mm. The wedge-shaped structural member (5a) arranged in the centre ensures breaking up of the coke batch (4) when the coke batch (4) slides across said structural member. The difference in height (10) intensifies the breaking up of the coke batch (4) in longitudinal direction.

FIG. 3 shows the receiving container (1) of the same quenching car (2) in a vertical view from above. The figure shows the top edge of the wedge-shaped structural member (5a), the said top edge extending across almost the entire length of the receiving container (1).

FIG. 4 shows the receiving container (1) with a multitude of wedge-shaped structural members (5). These are distributed over two rows of two structural members each (5) across the length of the receiving container (1). The coke cake (4) breaks up into two halves each (4a-d) when sliding across the wedge-shaped structural members (5a). This results in a break-up up of the coke batch (4a,4b) and an increase of the inner surface. In the centre there are two extended cuboid structural members (5b). This leads to a further break-up with a smaller surface. The lateral view corresponds to that of FIG. 2.

FIG. 5 shows the same receiving container (1) from above housing two rows of two wedge-shaped structural members each (5a) and a central row of two extended cuboid structural members (5b).

FIG. 6 shows a receiving container (1) of a quenching car (2) with two wedge-shaped (5a) and one cuboid (5b) structural member aligned transversely to the pushing direction. Two conical structural members (5a) are arranged in the front part of the receiving container (1) longitudinally to the pushing direction, two other structural members (5) are conical (5c) and arranged (not shown here) in the back part of the receiving container (1). During the pushing operation the coke cake (4) slides across the structural members (5a,5b) and breaks up into several batches (4a-4f).

FIG. 7 shows the same receiving container (1) in a lateral view, with two conical structural members (5c) already covered by the incoming coke cake (4) being shown in the front part of the receiving container (1). In the centre of the receiving container (1) there is an uncovered, cross-arranged cuboid structural member (5b) and in the back part of the receiving container (1) there are nine wedge-shaped structural members (5a) arranged in two rows in parallel to the pushing direction of the coke cake (1). The lateral view corresponds to that of FIG. 2. As already shown in FIG. 2 the coke cake (4) must overcome a difference in height (10) when entering the receiving container (1) from the coke-oven chamber. Here, the receiving container is equipped with a cover. Here, the receiving container (1) is equipped with a cover (1a).

FIG. 8 shows the same receiving container (1) from above housing two rows of two wedge-shaped structural members each (5a) in the front part of the receiving container (1), one cross-arranged cuboid structural member (5b) in the centre and six conical structural members (5c) in the back part of the receiving container (1).

Figure 9:
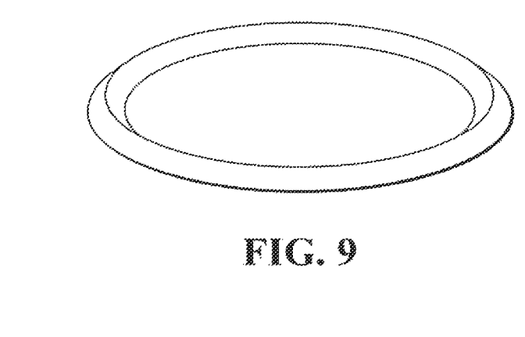
FIG. 9 illustrates a ring shaped structural member.
Figure 10:
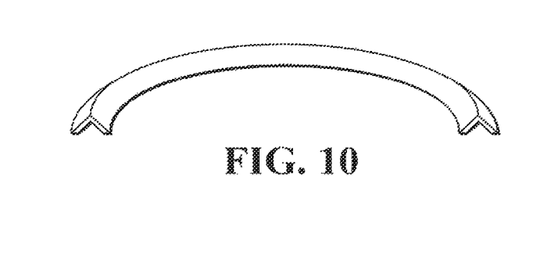
FIG. 10 illustrates a half-ring structural member.
Figure 11:
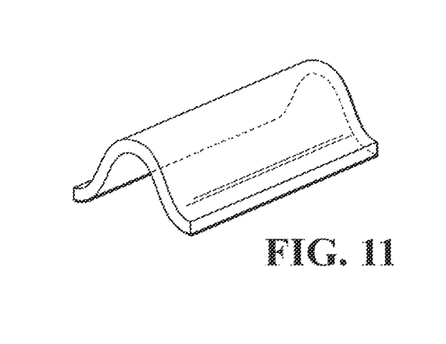
FIG. 11 illustrates a hump shaped structural member.

FIGS. 9, 10, and 11 show, respectively, one embodiment each of a ring shaped structural member, and a half ring structural member, and a hump-shaped structural member.

Figure 12:
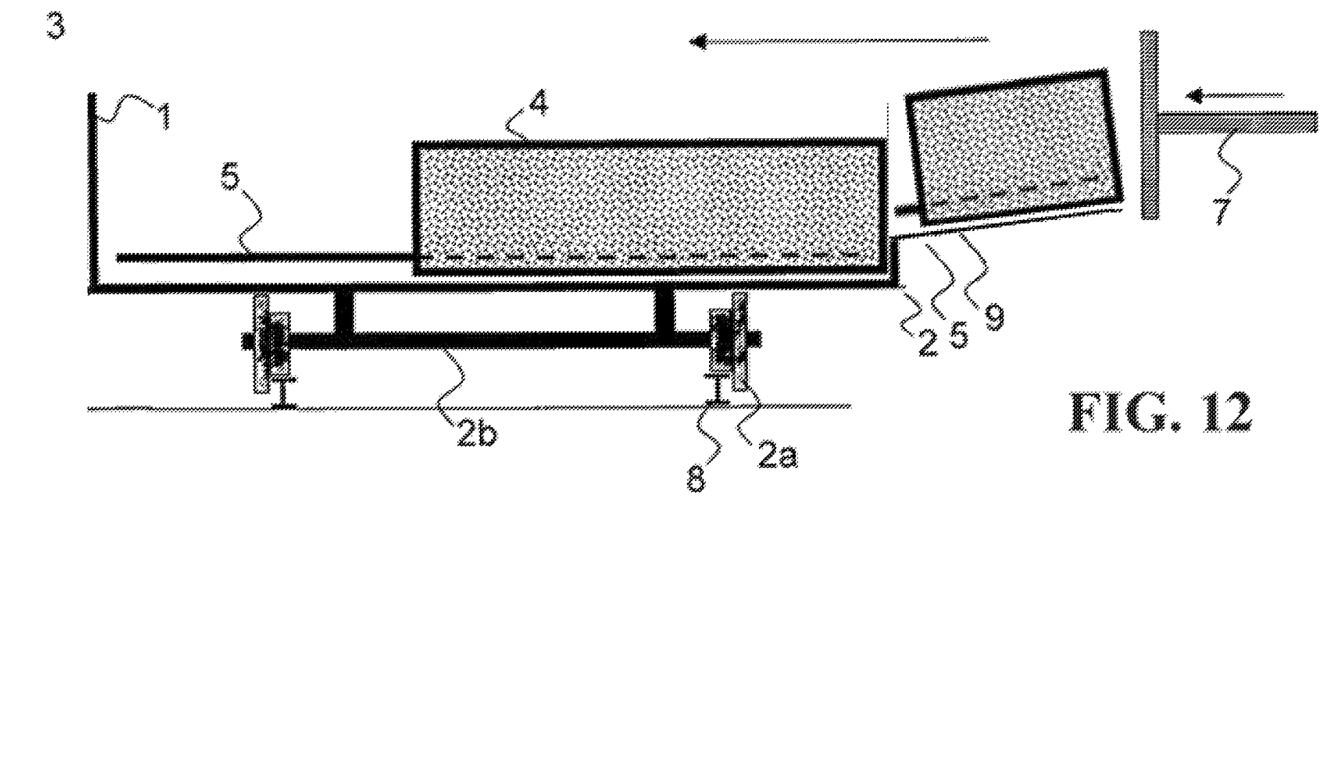
FIG. 12 illustrates another embodiment of a receiving container of the invention.

FIG. 12 shows a lateral view of the same receiving container (1) as depicted in the embodiment of FIG. 2 with a sloped plate (9) or wharf between the bottom of the coke-oven chamber (11) and the receiving container (1) for transferring the coke (4), the wharf (9) being provided with at least one heat-resistant structural member (5) producing unevenness of a height of min. 20 mm.

LIST OF REFERENCE NUMBERS AND DESIGNATIONS

1 Receiving container
1a Cover of the receiving container
2 Quenching car
2a Axles of the quenching car
2b Wheels of the quenching car
3 Door of the coke-oven chamber
4 Coke cake
4a-f Coke batches
5 Structural member
5a Wedge-shaped structural member
5b Cuboid structural member
5c Conical structural member
6 Quenching water
7 Pusher ram of the pusher machine
8 Rails
8 Wharf, sloped plate
10 Difference in height, Δh
11 Coke-oven chamber

The invention claimed is:

1. In a coking device for coking of coal in a horizontal coke oven chamber of a heat-recovery or non-recovery coke oven bank, the coke oven chamber having a coke-bearing bottom, and optionally a sloped plate or a wharf between the coke oven chamber and a receiving container, the receiving container having a bottom, the receiving container provided on or in a coke quenching car moveable in parallel along the coke oven bank to receive a compact coke cake from a coke oven, the improvement comprising:
  increasing the exposed surface area of a compact coke cake by at least one structural member providing an unevenness of a minimum height of 20 mm arranged on the bottom of the receiving container, wherein the bottom surface of the receiving container is offset by from 20 to 400 mm below the coke-bearing bottom of the coke oven chamber or the sloped plate or wharf, wherein the receiving container having a bottom with the at least one structural member disposed thereon is arranged in a manner that the coke cake, when pushed from the coke oven chamber, slips out of the coke-oven chamber during the pushing operation and slides across the structural member.

2. The device according to claim 1, wherein the structural member is wedge-shaped.

3. The device according to claim 1, wherein the structural member is cuboid.

4. The device according to claim 1, wherein the structural member is ring-shaped.

5. The device according to claim 1, wherein the structural member is half-ring-shaped, the ring-forming half on the bottom of the receiving container being aligned in any direction.

6. The device according to claim 1, wherein the structural member is hump-shaped.

7. The device according to claim 1, wherein the structural member is conical.

8. The device according to claim 1, wherein the structural members comprise a plurality of different shapes.

9. The device according to claim 1, wherein the at least one structural comprises a plurality of structural members arranged in rows.

10. The device according to claim 1, wherein a plurality of structural members are arranged in rows such that coke-impermeable air gaps are located between the rows of structural members, these air gaps aerating the bottom of the receiving container downwards.

11. The device according to claim 1, wherein the at least one structural member is made of a ceramic material.

12. The device according to claim 1, wherein the at least one structural member is made of a silicon-containing or aluminium-containing oxidic material.

13. The device according to claim 1, wherein the at least one structural member is made of a heat-resistant metal.

14. The device according to claim 1, wherein the at least one structural member is made of heat-resistant steel.

15. The device according to claim 1, wherein a sloped plate or wharf between the bottom of the coke-oven chamber and the receiving container for transferring the coke is present, and the wharf or sloped plate is provided with at least one heat-resistant structural member producing an unevenness of a height of minimally 20 mm.

16. A Method for increasing the inner surface of a compact coke batch in a receiving container comprising employing the device of claim 1, the method comprising:

charging the coke-oven chamber of the heat-recovery or non-recovery type coke-oven bank with coal for carbonisation, and carbonizing the coal in an operating cycle, and following carbonizing, pushing the coke in the form of a compact and solid coke cake by a pusher machine from the coke-oven chamber into the receiving container of a quenching car, wherein during pushing the compact and solid coke cake is pushed into the receiving container across the at least one structural member producing unevenness on the bottom of the receiving container, such that the fresh and glowing coke breaks up towards the top and is divided into several parts.

17. The method of claim 16, wherein at least one structural member is made of combustible material and the structural member is replaced after each pushing operation.

* * * * *